March 9, 1943. A. A. REISER 2,313,090
PLUG VALVE
Filed Sept. 29, 1939 3 Sheets-Sheet 1
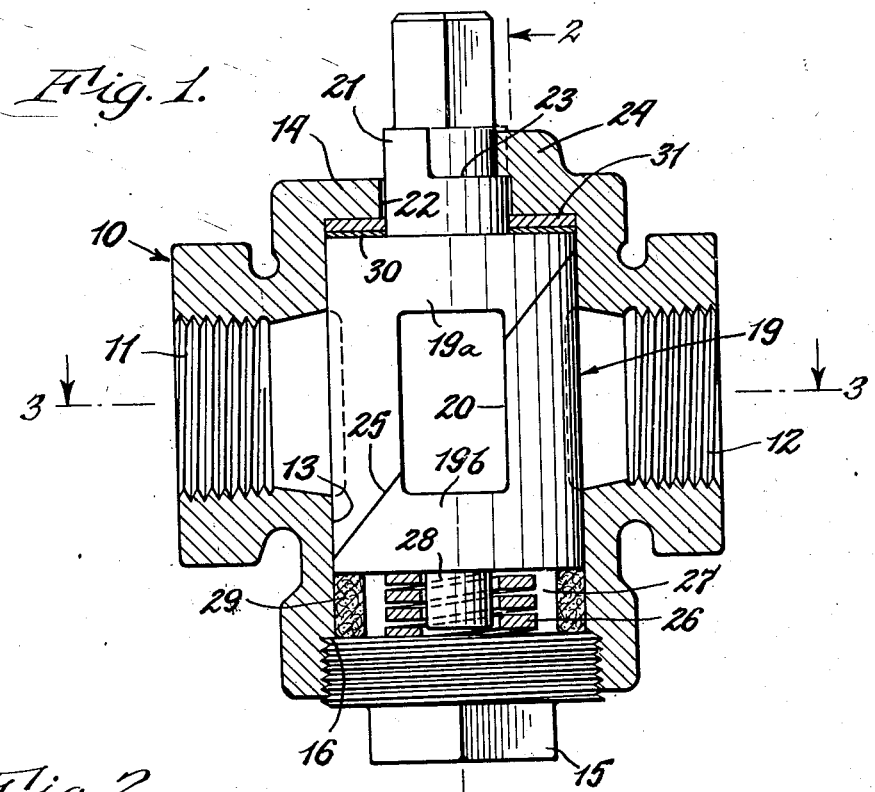
Fig. 1.
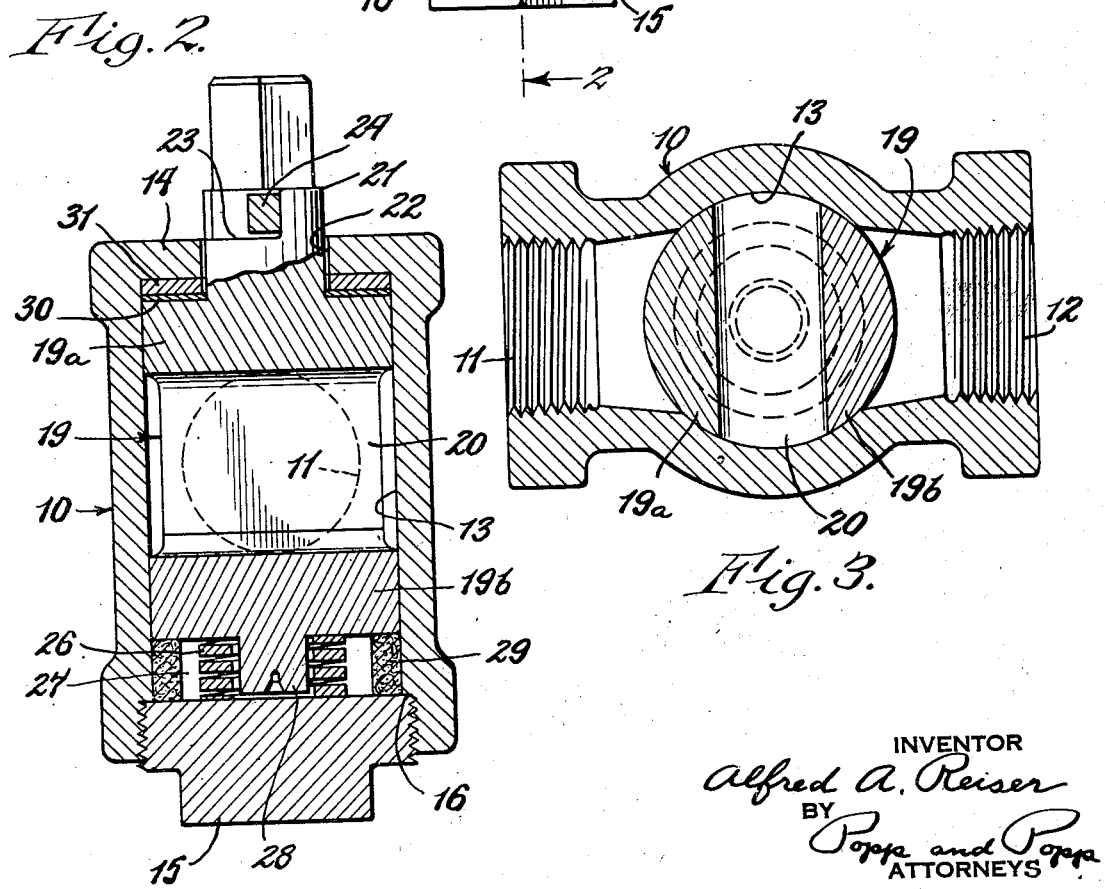
Fig. 2.
Fig. 3.
INVENTOR
Alfred A. Reiser
BY
Popp and Popp
ATTORNEYS

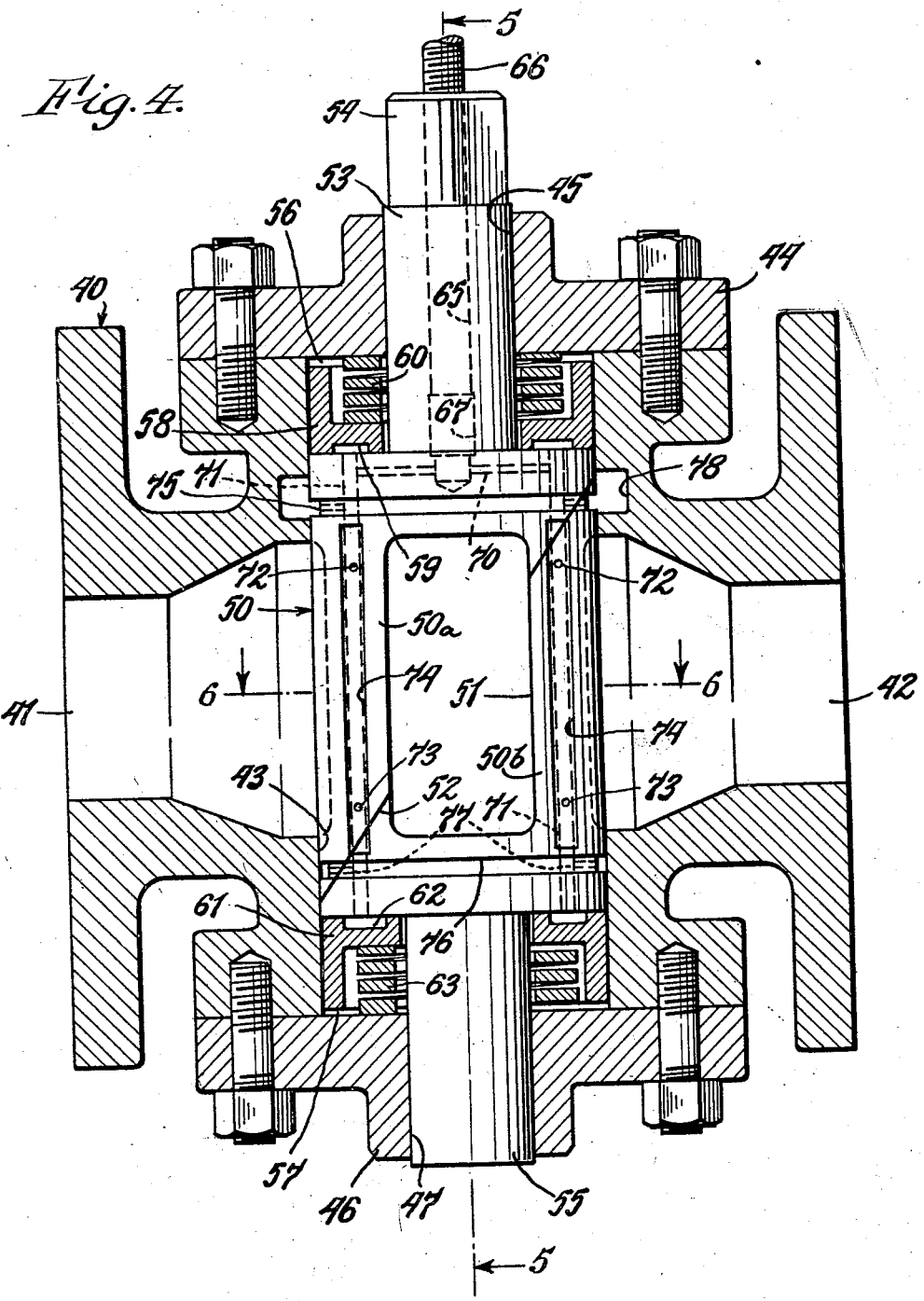

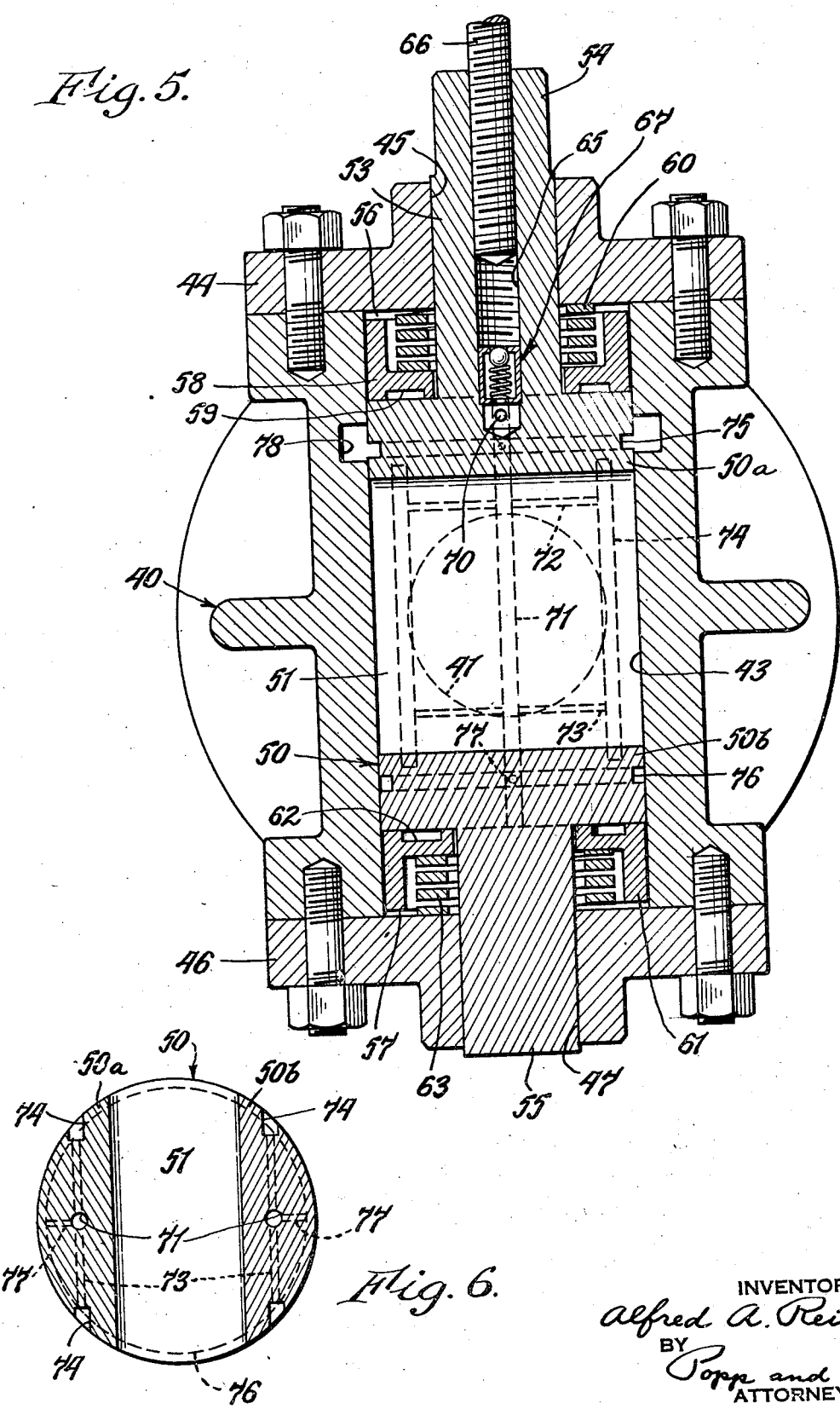

Patented Mar. 9, 1943

2,313,090

UNITED STATES PATENT OFFICE 2,313,090

PLUG VALVE

Alfred A. Reiser, Buffalo, N. Y.

Application September 29, 1939, Serial No. 297,149

12 Claims. (Cl. 251—93)

This invention relates to a plug valve and more particularly to a lubricated split plug valve in which the valve plug is so designed and held as to provide a non-sticking, long lived, tightly sealed valve which will remain properly lubricated for a long period of service.

One of the principal objects of the invention is to provide a plug valve of the straightway type in which the plug is split into two parts in a diagonal plane parallel with the port axis of the plug, with the trailing part held axially in yielding engagement with the positively rotated part of the plug, this splitting providing a full port seal against both the inlet and outlet of the body with quarter turn operation of the plug from on to off position and vice versa.

Another object is to provide such a split plug valve having broad contacting surfaces between the two parts of the plug along the line of the split to retain an effective lubricant seal and in which these surfaces are fully protected at all points to retain the lubricant seal and to prevent the introduction of foreign material between the two parts of the plug. This unbroken contact between the two parts of the valve plug also provides a fully effective port seal particularly when the plug is in the "on" position. This lubricant seal at the line of the split also accomplishes a confinement of the lading within the plug when in the "off" position, this improving the port seals by the expansive action of such confined lading.

Another object is to provide such a split plug valve which provides a complete port seal in handling lading under pressure or under vacuum or under pressure and vacuum simultaneously.

Another purpose is to provide such a split plug valve in which the ports can be made of the desirable rectangular form.

Another aim is to provide a split plug so designed and arranged as to permit an expansive action of the lading in the valve under freezing conditions.

Another object of the invention is to provide such a split plug valve in which the parts of the valve plug are held in operative relation by opposed springs, these opposed springs providing protection against valve failure due to breakage of one of the springs.

Another aim is to provide a plug valve in which continued adequate lubrication is insured by an oil chamber at the base of the plug, the oil being supplied to the contacting surfaces of the plug and bore by capillary action.

Another aim is to provide such a plug valve having a base oil chamber in which the plug is so split as to insure a close fit and adequate capillary lubrication of the plug from the base oil chamber.

Another object is to provide such a valve in which the plug is positively released when subject to a corrosive lading.

Another object is to provide a split plug valve in which the independent action of the parts of the plug result in a positive port seal at both the inlet and outlet ports.

Another object is to provide such a valve in which head leaking is avoided.

Another object is to provide such a valve having a tight lubricated seal of the valve plug against both the inlet and outlet ports of the valve body, this greatly reducing head leaks and improving the port seal.

Another object is to provide a form of such a lubricated valve plug in which the lubrication is effected positively.

Another aim is to provide such a valve in which the use of lubricant is reduced to a minimum, the valve plug being held with a yielding pressure against the bore of the valve body so as to insure improved retention of the lubricant between the surfaces of the plug and the bore and to prevent washing out of the lubricant particularly on the pressure-port side of the plug.

Another object is to provide such a valve in which a reserve supply of lubricant is maintained in the valve so that negligence on the part of the user in the matter of lubrication will not result in the valve becoming inoperative and create a possible hazard.

Other objects are to provide such a valve which is inexpensive in construction and can be produced at low cost and which will operate at full efficiency for a long period of time without requiring attention or repair.

In the accompanying drawings:

Fig. 1 is a vertical central section through one form of lubricated split plug valve embodying my invention.

Fig. 2 is a transverse vertical section, taken on line 2—2, Fig. 1.

Fig. 3 is a horizontal section, taken on line 3—3, Fig. 1.

Fig. 4 is a view similar to Fig. 1 and showing a modified form of valve embodying my invention.

Fig. 5 is a transverse vertical section, taken on line 5—5, Fig. 4.

Fig. 6 is a horizontal section, taken on line 6—6, Fig. 4.

In the form of the invention shown in Figs.

1-3, the valve body 10 is provided with coaxial inlet and outlet ports 11 and 12 leading to a cylindrical chamber 13 which is bored from the bottom of the body to a point short of the top of the body so as to leave a wall 14 enclosing the upper end of the cylindrical chamber 13. The open lower end of the cylindrical chamber 13 is closed by a screw plug 15 which engages threads provided at the lower end of the bore and is screwed against a shoulder 16 in the valve body.

The valve plug 19 is of cylindrical form closely fitting the cylindrical chamber 13 and is arranged in the upper part of this chamber in centered relation to the inlet and outlet ports 11, 12. This plug is provided with a port 20, which can be of rectangular or any other form and extends transversely through the plug and arranged to align with the inlet and outlet ports of the valve body. The valve plug is provided with an axial stem 21 which projects through an opening 22 in the center of the wall 14 and may be squared at its upper end to permit of turning the stem to rotate the plug to open and closed position. The valve is a quarter turn valve and hence the valve stem 21 is shown as provided with a recess 23 extending 90° around the valve stem so as to provide stop shoulders for a stop lug 24 formed on the upper wall 14 of the valve body and projecting into this recess.

The principal feature of the present invention resides in sawing the valve plug 19 into two completely separate parts 19a and 19b along a diagonal plane parallel to the axis of the port 20 extending through the valve plug 19. This split is indicated at 25. This split is provided by sawing and the contacting surfaces need not be machined after the sawing. The split proceeds from a point adjacent the upper end of the valve plug at one side substantially parallel to the axis of the port 20 of the valve plug to a point adjacent the lower end of the valve plug at its opposite side. It will be noted that this saw cut provides broad contacting surfaces at the split between the two parts 19a and 19b of the valve plug 19. The surfaces may be in actual contact or may be separated by a shim (not shown) of non-corrosive material, such as brass, Monel metal, Bakelite, etc.

The two parts 19a and 19b of the plug are held in contact with each other and are caused to expand diametrically by a compressive spring 26 arranged in a lubricant chamber or reservoir 27, this chamber being located between the lower part 19b of the valve plug and the screw plug 15 of the valve body. This spring is held in coaxial relation to the valve plug 19 by a downwardly projecting centering lug 28 provided on the lower part 19b of the valve plug.

The chamber 27 is adapted to contain a reserve supply of lubricant and to supply this lubricant to the contacting surfaces of the valve plug 19 and the wall of the cylindrical chamber 13, a washer 29 of absorbent material is arranged in the chamber 27 in contact with the outer wall thereof and held in a compressed condition between the lower part 19b of the valve plug and the screw plug 15. This washer 29 acts as a wick, feeding the lubricant to the clearance between the valve plug 19 and its bore, which is preferably about .003 of an inch and this lubricant feeding from this surface to the contacting surfaces between the two parts 19a and 19b of the plug along the split 25. This feeding of lubricant is facilitated by the slightly offset relation between the two parts 19a and 19b of the plug maintained by the compression spring 26.

To provide a head seal for the valve a steel wear washer 30 is arranged on top of the upper part 19a of the plug and closely fitted to its stem and a washer 31 of asbestos graphite composition or the like is interposed between this wear washer 30 and the wall 14 of the valve body.

The valve illustrated in Figs. 1-3 is primarily designed for low pressure service when a non-sticking, long lived valve is required. By splitting the valve plug as at 25 along a diagonal plane parallel with the axis of the valve plug port 20, neither part of the valve plug can jam or bind. In operation full turning torque is applied momentarily to the upper part 19a of the valve plug. This turning torque is applied to the lower part 19b of the valve plug and at the same time the upper part 19a acts as a cam to exert a downward pressure on the lower part 19b of the valve plug. This downward movement of the lower part 19b of the plug serves to break the seal with the bore and insure against sticking even after an extended period of idleness.

Upon release of the valve in either its open or closed position, the spring 26, exerting axial pressure against the faces of the two parts of the plug at the split, acts to expand the two parts 19a and 19b of the plug diametrically. Through this expansion, the two parts seek perfect alignment with the bore 13 of the valve body and since the split extends parallel with the axis of the port 20 of the plug it will be seen that this expansion serves to insure a reliable seal between each part of the valve plug and the corresponding port of the valve body. This arrangement of the split also permits of a rectangular port through the valve plug and also provides a construction which s adapted to a quarter turn, straightway type valve and in which the diagonal split is so arranged as to be entirely protected against the entrance of lading so that the lubricant seal supplied from the clearance between the plug and the bore is retained without substantial loss. It will also be noted that the contacting surfaces at the split are broad so as to retain this seal of lubricant and that the head washers in combination with the compression spring insure an adequate head seal for the valve. The splitting of the plug also provides a cushion against severe line shock and permits of expansion of the lading in the plug, as by freezing, without bursting.

The form of the invention shown in Figs. 4-6 shows a modified form of the invention in which lubricant is supplied under pressure from the exterior and in which the plug is split in the manner shown in Figs. 1-3, but the spring pressure is applied from opposite ends of the split plug.

As with the form of the invention shown in Figs. 1-3, the valve body 40 is provided with coaxial inlet and outlet ports 41 and 42 leading to a cylindrical chamber 43 which is bored through the valve body. One end of this chamber is closed by an end head 44 having a bore 45 concentric with its axis and the other end of this chamber is closed by an end head 46 having a bore 47 concentric with its axis. These end heads 44 and 46 can be secured in any suitable manner as by the stud bolts and nuts illustrated.

The valve plug 50 is of cylindrical form closely fitting the cylindrical chamber 43 and is arranged in the central part of this chamber in centered relation to the inlet and outlet ports 41 and 42 of the valve body. This plug is provided with a rectangular port 51 extending transversely through the plug and arranged to align with the inlet and outlet ports of the valve body. The valve plug 50 is sawed into two completely separate parts along a diagonal plane, indicated at 52, this split extending parallel with the axis of the port 51 from adjacent the upper corner of the plug at one side of this port to adjacent the lower corner at the opposite side of the plug.

The part 50a of the plug is provided with a stem 53 which turns in the bore 45 of the head 44 and has its outer end 54 made in out-of-round form for the application of a suitable handle (not shown) to turn the plug and open and close the valve. The opposite part 50b of the plug is similarly provided with a stem 55 which turns in the bore 47 of the head 46.

The valve plug 50 is substantially shorter than the bore 43 so as to provide chambers 56 and 57 at the opposite ends of the plug. Arranged in the chamber 56 is an annular follower 58 which can be made of brass or other suitable material and is provided with an axially extended outer wall which is closely fitted to the bore 43 of the valve body, this follower loosely fitting around the stem 53. This follower is provided in its face which contacts the end face of the plug 50 with an annular, relatively broad groove 59 and the follower is urged against the valve plug 50 by a helical compression spring 60 interposed between this follower and the end head 44 of the valve body. This spring surrounds the valve stem 53 and is surrounded by the extended outer wall of the follower 58, sufficient clearance being provided between the upper end of this follower and the end head 44 to permit the part 50a of the plug to move upwardly against the resistance of the spring 60. Similarly, an annular follower 61 of brass or other suitable material is arranged in the chamber 57 at the opposite end of the valve plug, this follower being provided with an annular groove 62 in its face engaging with the end of the valve plug part 50b and being provided with an axially extended outer wall which is spaced a short distance from the end head 46 so as to permit a limited amount of movement of the valve plug toward this head. This follower 61 is held against the end of the lower part 50b of the valve plug by a helical compression spring 63 which is interposed between the valve plug and the end head 46 and surrounds the stem 55 and is surrounded by the extended outer wall of the follower 61, as best shown in Fig. 4.

It will be seen that the two compression springs 60 and 63 work in opposition to one another and serve to keep the floating valve plug 50 in centered relation to the ports 41 and 42 of the valve body. At the same time if either of these two springs should break, the valve is not rendered inoperative. These springs also serve to hold the followers 58 and 61 in close engagement with the ends of the valve plug 50 so as to prevent leakage of lading or lubricant past the stems 53 and 55 of the valve plug.

To lubricate the valve the valve stem 53 is provided with a central bore 65 which is threaded at its upper end to receive a screw 66, this screw forcing the lubricant in this bore through a series of ducts as hereinafter described. The bore 65 extends into the upper part 50a of the valve plug but is stopped short of the port 51, as best shown in Fig. 5. A check valve 67 of any suitable form is arranged in the lower part of the bore 65.

Below the check valve 67 the bore 65 communicates with a horizontal duct 70 which is composed of two branches each branch leading to a vertical duct 71, each of these vertical ducts extending through the two parts 50a and 50b of the valve plug to the opposite end faces of the valve plug on opposite sides of its port 51, as best shown in Fig. 6. These vertical ducts 71 align with the annular grooves 59 and 62 in the followers 58 and 61, respectively, so as to supply lubricant to these grooves. Each of the vertical ducts 71 also communicates with an upper horizontal duct 72 and a lower horizontal duct 73, the pair of these ducts 72, 73 at one side of the valve plug being drilled in the part 50a thereof and the pair of these ducts at the opposite side of the valve plug being drilled in the other part 50b thereof, as best shown in Fig. 4. Each of these ducts 72, 73 communicates at its opposite ends with the upper and lower ends of vertical lubricant grooves 74 formed in the cylindrical face of the valve plug, four of these grooves being thereby provided. These vertical grooves are spaced a substantial distance from the port 51 through the valve plug and serve to insure lubrication between the valve plug 50 and its bore 43.

The valve plug 50 is additionally provided at its upper and lower ends with annular lubricant grooves 75 and 76 which are arranged above and below the port 51 through the plug. These annular grooves are supplied with lubricant by a small branch duct 77 leading to these grooves from the upper and lower ends of each of the vertical ducts 71. To provide a reservoir for lubricant, a large annular reservoir groove 78 is formed internally in the valve body 40 in register with the upper annular lubricant groove 75 of the valve plug, as best shown in Fig. 5. This reservoir receives a substantial quantity of lubricant and in the event of insufficient lubrication through the bore 65 serves to supply the external grooves of the valve plug with lubricant.

With the form of the invention shown in Figs. 4-6 the feature of splitting the plug of the valve on a plane at an angle to the major axis of the plug and substantially parallel with the axis of its ports 51 provides the same advantages which are obtained in the form of the invention illustrated in Figs. 1-3. That is, the springs 60 and 63 bearing against the ends of the two parts of the valve plug serve to expand these parts radially relative to one another so as to obtain a reliable seal between these parts and the inlet and outlet ports of the valve body, especially in the closed position of these parts, as illustrated in Fig. 4. At the same time this expansion serves to insure a tight fit of the parts of the valve plug within the bore of the valve and the pressure exerted by the two springs against the parts serves to prevent the loss of lubricant from the contacting surfaces between the two parts. As with the form of the valve illustrated in Figs. 1-3, the turning of the upper part of the valve plug serves momentarily to move the other part axially so as to effectively prevent the valve from sticking, especially where a corrosive lading is being handled or where the valve has not been used for a long time or has not been properly lubricated. The other features of the split plug referred to in the description of the form of the invention shown in Figs. 1-3 also apply.

In addition, by the use of a floating type of plug the valve is better adapted to high pressures and to resist line shocks. Also, in the event of the failure of one of the springs the valve would not be rendered inoperative, such breakage merely effecting a slight axial movement of the valve plug toward the broken spring. This form of the invention also illustrates how lubricant under pressure can be supplied to the valve plug even when divided in two parts, the lubricant being supplied by a simple series of ducts to the six external grooves provided in the valve plug. With this form of the invention a reserve supply of lubricant is also contained within the enlarged channel 78 of the valve body so that proper lubrication will be maintained even if the operator is negligent in the matter of lubrication.

From the foregoing it will be seen that the present invention provides a lubricated split plug valve in which the valve plug is so split and held under spring pressure as to provide a non-sticking, long lived, tightly sealed valve which will remain properly lubricated for a long period of service and which will stand up under severe conditions of line shocks and freezing and will operate with a minimum of lubricant. While I have illustrated two specific forms of my invention, it will be understood that the invention is susceptible of various modifications and the invention is therefore not to be construed as limited to the specific embodiments shown but is to be accorded the full range of equivalents comprehended by the accompanying claims.

I claim as my invention:

1. A straightway plug valve, comprising a valve body having inlet and outlet ports leading to a cylindrical bore extending inwardly from one end thereof, a removable end head enclosing said one end of said bore, a cylindrical valve plug of shorter length than said bore and fitted in said bore and having a through port cooperating with said inlet and outlet ports, said valve plug being divided into two parts on a plane extending at an angle to the major axis of the valve plug and parallel with the axis of its through port, a valve stem connected to one of said valve plug parts for turning said valve plug, an axial stem on the other of said valve plug parts and extending toward said removable end head and a coaxial helical compression spring held in centered relation by said axial stem and interposed between said removable end head and said other valve plug part to urge said other valve plug part into planar engagement with said one valve plug part and also to form an oil reservoir chamber between said other valve plug part and said removable end head and a washer of absorbent material in said chamber surrounding said spring and held under compression against said bore to supply lubricant to the contacting faces of said valve plug and bore.

2. A plug valve, comprising a valve body having inlet and outlet ports leading to a cylindrical bore and having end heads enclosing the ends of said bore and at least one of which is removable, a cylindrical valve plug of shorter length than said bore and floatingly fitting in said bore and having a port cooperating with said inlet and outlet ports, said valve plug being divided into two parts on a plane extending at an angle to the major axis of the plug, means for turning one of said valve plug parts and means for urging said valve plug parts axially into planar engagement with one another, comprising a follower interposed between the end face of each of said valve plug parts and the corresponding end head of said valve body and a helical compression spring interposed between each of said followers and the corresponding end head and each of said followers being provided with an axially extended portion to limit the movement of the valve plug in the corresponding direction.

3. A plug valve, comprising a valve body having inlet and outlet ports leading to a cylindrical bore and having end heads enclosing the ends of said bore and at least one of which is removable, a cylindrical valve plug of shorter length than said bore and floatingly fitted in said bore and having a port cooperating with said inlet and outlet ports, said valve plug being divided into two parts on a plane extending at an angle to the major axis of the plug and each part being provided with an axially extending stem at least one of which extends through a bore provided in one of said end heads to permit of turning said valve plug, and means for urging said valve plug parts axially into planar engagement with one another, comprising a cylindrical follower surrounding each of said stems and having an extended outer cylindrical wall fitting said bore and limiting the axial movement of said valve plug in a corresponding direction and a helical compression spring interposed between each of said followers and the corresponding end head.

4. A plug valve, comprising a valve body having a cylindrical bore and inlet and outlet ports extending from the cylindrical wall of said bore, a cylindrical plug rotatably mounted in said bore and having a port cooperating with said inlet and outlet ports, said cylindrical bore being greater in length than said cylindrical plug and said valve body being formed to provide a closure at each end of said bore at least one of which closures forms a wall of a chamber the opposite wall of which is formed by the circular end face of said cylindrical plug, said valve plug being divided into two main parts along at least one plane arranged at an angle to the major axis of said plug and providing faces having substantially full planar contact with each other in all positions which said parts assume relative to each other in said bore, said main parts comprising a driving part and a follower part, means connected to said driving part only for rotating said driving part, said follower part being rotated through pressure applied by said driving part against said angular face of said follower part, spring means interposed between said body and plug and urging said plug parts into compressive relation with each other and with the wall of said bore, said plug parts being further urged into compressive relation with each other and with the wall of said bore by confined static pressures created in said chamber by the line pressures applied to said valve.

5. A plug valve, comprising a valve body having a cylindrical bore and inlet and outlet ports extending from the cylindrical wall of said bore, a cylindrical plug rotatably mounted in said bore and having a port cooperating with said inlet and outlet ports, said cylindrical bore being greater in length than said cylindrical plug and said valve body being formed to provide a closure at each end of said bore at least one of which closures forms a wall of a chamber the opposite wall of which is formed by the circular end face of said cylindrical plug, said valve plug being divided into two main parts on a plane extending at an angle to the major axis of the plug and providing faces having substantially full planar contact with each other in all positions which said parts assume relative to each other in said bore, said main parts comprising a driving part and a follower part, means connected to said driving part only for rotating said driving part, said follower part being rotated through pressure applied by said driving part against said angular face of said follower part, spring means interposed between said body and plug and urging said plug parts into compressive relation with each other and with the wall of said bore, said plug parts being further urged into compressive relation with each other and with the wall of said bore by confined static pressures created in said chamber by the line pressures applied to said valve.

6. A plug valve, comprising a valve body having a cylindrical bore and inlet and outlet ports extending from the cylindrical wall of said bore, a cylindrical plug rotatably mounted in said bore and having a port cooperating with said inlet and outlet ports, said cylindrical bore being greater in length than said cylindrical plug and said valve body being formed to provide a closure at each end of said bore at least one of which closures forms a wall of a chamber the opposite wall of which is formed by the circular end face of said cylindrical plug, said valve plug being divided into two main parts on a plane extending at an angle to the major axis of the plug and intersecting the plug port and providing faces having substantially full planar contact with each other in all positions which said parts assume relative to each other in said bore, said main parts comprising a driving part and a follower part, means connected to said driving part only for rotating said driving part, said follower part being rotated through pressure applied by said driving part against said angular face of said follower part, spring means interposed between said body and plug and urging said plug parts into compressive relation with each other and with the wall of said bore, said plug parts being further urged into compressive relation with each other and with the wall of said bore by confined static pressures created in said chamber by the line pressures applied to said valve.

7. A plug valve, comprising a valve body having a cylindrical bore and inlet and outlet ports extending from the cylindrical wall of said bore, a cylindrical plug rotatably mounted in said bore and having a port cooperating with said inlet and outlet ports, said cylindrical bore being greater in length than said cylindrical plug and said valve body being formed to provide a closure at each end of said bore at least one of which closures forms a wall of a chamber the opposite wall of which is formed by the circular end face of said cylindrical plug, said valve plug being divided into two main parts on a plane extending at an angle to the major axis of the plug and providing faces having substantially full planar contact with each other in all positions which said parts assume relative to each other in said bore, said main parts comprising a driving part and a follower part, means connected to said driving part only for rotating said driving part, said follower part being rotated through pressure applied by said driving part against said angular face of said follower part, spring means in said chamber interposed between said body and plug and urging said plug parts into compressive relation with each other and with the wall of said bore, said plug parts being further urged into compressive relation with each other and with the wall of said bore by confined static pressures created in said chamber by the line pressures applied to said valve.

8. A valve comprising a valve body having a bore and inlet and outlet openings in the sides of the bore, a valve member rotatably mounted in the bore and having a port arranged to connect said openings for the passage of fluid under pressure, said valve member consisting of two parts mating along a plane oblique to the rotary axis of the valve member to provide sliding engagement between the parts, said parts being retained in engagement, means connected with one part for rotating said parts, and a chamber exposed to an end of one of said parts, said chamber being accessible to fluid pressure for urging the parts of said valve member into compressive relation with each other and thus slide them on their engaging surfaces to force the outer surfaces of said parts against the bore of the valve body and seal the inlet and outlet openings.

9. In a pressure seated valve, the combination of a valve body having a bore and inlet and outlet openings in the sides of the bore, a valve member rotatably mounted in the bore and having a port arranged to connect said openings for the passage of fluid under pressure, said valve member consisting of two parts mating along parallel planes extending in opposite directions from said port to the exterior of said member and oblique to the rotary axis of the valve member to provide sliding engagement between the parts, said parts being retained in substantial engagement, means connected with one part for rotating said parts, and a chamber exposed to an end of one of said parts, said chamber being accessible to the line pressure controlled by said valve member, the pressure on the outer end of the plug part exposed to said chamber being greater than the effective opposing pressure on said part for urging both parts of said valve member into compressive relation with each other and thus slide them on their engaging surface to force the outer surfaces of said parts against the bore of the valve body and seal the inlet and outlet openings.

10. In a pressure seated valve, the combination of a valve body having a bore and inlet and outlet openings in the sides of the bore, a valve member rotatably mounted in the bore and having a port arranged to connect said openings for the passage of fluid under pressure, said valve member consisting of two parts mating along coincident planes extending in opposite directions from said port to the exterior of said member and oblique to the rotary axis of the valve member to provide sliding engagement between the parts, said parts being retained in substantial engagement, means connected with one part for rotating said parts, and a chamber exposed to an end of one of said parts, said chamber being accessible to the line pressure controlled by said valve member, the pressure on the outer end of the part exposed to said chamber being greater than the effective opposing pressure on said part for urging both parts of said valve member into compressive relation with each other and thus slide them on their engaging surfaces to force the outer surfaces of said parts against the bore of the valve body and seal the inlet and outlet openings.

11. A valve comprising a valve body having a bore and inlet and outlet openings in the sides of the bore, a valve member rotatably mounted in the bore and having a port arranged to connect said openings for the passage of fluid under pressure, said valve member consisting of two parts mating along a plane oblique to the rotary axis of the valve member to provide sliding engagement between the parts, means for retaining the two parts in engagement, means connected with one part for rotating said parts, and a chamber exposed to an end of one of said parts, said chamber being accessible to fluid pressure for urging the parts of said valve member into compressive relation with each other and thus slide them on their engaging surfaces to force the outer surfaces of said parts against the bore of the valve body and seal the inlet and outlet openings.

12. A valve comprising a valve body having a bore and inlet and outlet openings in the sides of the bore, a valve member rotatably mounted in the bore and having a port arranged to connect said openings for the passage of fluid under pressure, said valve member consisting of two parts mating along a plane oblique to the rotary axis of the valve member to provide sliding engagement between the parts, means effective at both ends of the valve member for retaining the two parts in engagement, means connected with one part for rotating said parts, and a chamber exposed to an end of one of said parts, said chamber being accessible to fluid pressure for urging the parts of said valve member into compressive relation with each other and thus slide them on their engaging surfaces to force the outer surfaces of said parts against the bore of the valve body and seal the inlet and outlet openings.

ALFRED A. REISER.